United States Patent
Ma et al.

(10) Patent No.: US 8,750,629 B2
(45) Date of Patent: Jun. 10, 2014

(54) METHOD FOR SEARCHING AND RANKING IMAGES CLUSTERED BASED UPON SIMILAR CONTENT

(75) Inventors: Yue Ma, Bellevue, WA (US); Justin D. Hamilton, Bellevue, WA (US); Fang Wen, Beijing (CN); Jian Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 12/958,242

(22) Filed: Dec. 1, 2010

(65) Prior Publication Data

US 2012/0106853 A1 May 3, 2012

(30) Foreign Application Priority Data

Nov. 1, 2010 (WO) ................ PCT/CN2010/078288

(51) Int. Cl.
*G06K 9/62* (2006.01)

(52) U.S. Cl.
USPC ............ 382/225; 382/218; 707/723; 707/737

(58) Field of Classification Search
CPC ................................................ G06F 17/30262
See application file for complete search history.

(56) References Cited

U.S. PATENT DOCUMENTS

| | | | | |
|---|---|---|---|---|
| 6,584,223 B1* | 6/2003 | Shiiyama | ...................... | 382/173 |
| 7,761,466 B1* | 7/2010 | Eshghi | .......................... | 707/772 |
| 7,904,455 B2* | 3/2011 | Chiu et al. | .................... | 707/737 |
| 8,238,663 B2* | 8/2012 | Kato | ............................. | 382/181 |
| 2006/0015495 A1 | 1/2006 | Keating et al. | | |
| 2007/0078846 A1* | 4/2007 | Gulli et al. | ........................ | 707/5 |
| 2007/0174269 A1 | 7/2007 | Jing et al. | | |
| 2007/0209025 A1* | 9/2007 | Jing et al. | ..................... | 715/968 |
| 2007/0271226 A1* | 11/2007 | Zhang et al. | ...................... | 707/3 |
| 2008/0168052 A1* | 7/2008 | Ott et al. | ........................... | 707/5 |
| 2009/0076800 A1* | 3/2009 | Li et al. | ........................... | 704/10 |
| 2009/0154795 A1 | 6/2009 | Tan et al. | | |
| 2010/0082618 A1* | 4/2010 | Ott et al. | ....................... | 707/730 |
| 2010/0131499 A1* | 5/2010 | van Leuken et al. | ........... | 707/723 |
| 2010/0131500 A1* | 5/2010 | van Leuken et al. | ........... | 707/723 |
| 2010/0284625 A1* | 11/2010 | Wang et al. | ................... | 382/229 |
| 2011/0029510 A1* | 2/2011 | Kroon et al. | .................. | 707/723 |

FOREIGN PATENT DOCUMENTS

| | | |
|---|---|---|
| CN | 101271476 | 9/2008 |
| CN | 101405725 | 4/2009 |
| WO | WO-2009128021 | 10/2009 |

OTHER PUBLICATIONS

Barnard and Forsyth, "Learning the Semantics of Words and Pictures," In International Conference on Computer Vision, pp. II: 408-415, 2001.*

Cai et al., "Hierarchical Clustering of WWW Image Search Results Using Visual, Textual and Link Information," Proceedings of the 12th annual ACM international conference on Multimedia, Oct. 10-16, 2004, New York, NY, USA.*

(Continued)

*Primary Examiner* — Bhavesh Mehta
*Assistant Examiner* — Andrew Moyer
(74) *Attorney, Agent, or Firm* — Dave Ream; Jim Ross; Micky Minhas

(57) ABSTRACT

Image search techniques are described. In one or more implementations, images in a search result are ordered based at least in part on similarity of the images, one to another. The search result having the ordered images is provided in response to a search request.

20 Claims, 5 Drawing Sheets

(56) References Cited

OTHER PUBLICATIONS

Cutting et al., "Constant Interaction—Time Scatter/Gather Browsing of Very Large Document Collections," Proceedings of the 16th annual international ACM SIGIR conference on Research and development in information retrieval, p. 126-134, Jun. 27-Jul. 1, 1993, Pittsburgh, Pennsylvania, United States.*
Zeng et al., "Learning to Cluster Web Search Results," Proceedings of the 27th annual international ACM SIGIR conference on Research and development in information retrieval, Jul. 25-29, 2004, Sheffield, United Kingdom.*
Cho et al., "Very Fast Concentric Circle Partition-Based Replica Detection Method," Advances in Image and Video Technology (2007): 907-918.*
Volkov and Demmel, "Benchmarking GPUs to Tune Dense Linear Algebra," Proceedings of the 2008 ACM/IEEE conference on Supercomputing, IEEE Press, 2008.*
Wiktionary definitions 1, 2, and 4 for the word "binary," Sep. 21, 2010, http://en.wiktionary.org/w/index.php?title=binary&oldid=10498937.*
Lux and Chatzichristofis, "Lire: lucene image retrieval: an extensible java CBIR library," MM '08 Proceedings of the 16th ACM international conference on Multimedia, pp. 1085-1088 (2008).*
Yang, Jun, et al. "Evaluating bag-of-visual-words representations in scene classification." Proceedings of the international workshop on Workshop on multimedia information retrieval. ACM, 2007.*
Datta, Ritendra, et al. "Toward bridging the annotation-retrieval gap in image search." IEEE Multimedia 14.3 (2007): 24.*
Wu, Lei, Steven CH Hoi, and Nenghai Yu. "Semantics-preserving bag-of-words models for efficient image annotation." Proceedings of the First ACM workshop on Large-scale multimedia retrieval and mining. ACM, 2009.*
Jing, Yushi, and Shumeet Baluja. "Visualrank: Applying pagerank to large-scale image search." Pattern Analysis and Machine Intelligence, IEEE Transactions on 30.11 (2008): 1877-1890.*
Wang, et al., "Large-Scale Duplicate Detection for Web Image Search", Retrieved at << http://cecs.uci.edu/~papers/icme06/pdfs/0000353.pdf >>, Multimedia and Expo, IEEE International Conference on, Jul. 9-12, 2006, p. 353-356.
Zamir, et al., "Grouper: A Dynamic Clustering Interface to Web Search Results", Retrieved at << http://users.cs.fiu.edu/~vagelis/classes/COP6776/publications/GrouperClustering.pdf >>, 1999, pp. 15.
Jing, et al., "Page Rank for Product Image Search", Retrieved at << http://www.www2008.org/papers/pdf/p307-jingA.pdf >>, Proceeding of the 17th international conference on World Wide Web, Apr. 21-25, 2008, p. 307-315.
Marée, et al., "Incremental Indexing and Distributed Image Search using Shared Randomized Vocabularies", Retrieved at << http://www.montefiore.ulg.ac.be/services/stochastic/pubs/2010/MDWG10/mir053-maree-author.pdf >>, Proceedings of the international conference on Multimedia information retrieval, Mar. 29-31, 2010, pp. 10.
Gorisse, et al., "Fast Approximate Kernel-Based Similarity Search for Image Retrieval Task", Retrieved at << http://figment.cse.usf.edu/~sfefilat/data/papers/ThAT9.33.pdf >>, Pattern Recognition,ICPR,19th International Conference on, Dec. 8-11, 2008, pp. 4.
"PCT Search Report and Written Opinion", Application No. PCT/CN2010/078288, (Aug. 18, 2011),11 pages.

* cited by examiner

300

302
Receive a search request having at least one term that is indicative of at least two or more different types of content in the images

304
Provide a search result in response to the search request, the search result having images that include a first type of the content positioned closer to a beginning of the search result than images having a second type of the content, the first type of the image having a larger number of similar images than the second type

*Fig. 3*

METHOD FOR SEARCHING AND RANKING IMAGES CLUSTERED BASED UPON SIMILAR CONTENT

CROSS REFERENCE TO RELATED APPLICATIONS

This application claims priority to PCT Application No. PCT/CN2010/078288, filed on Nov. 1, 2010 in the Chinese Receiving Office and titled "Image Search," the entire disclosure of which is hereby incorporated by reference in its entirety.

BACKGROUND

Users may interact with a search engine to obtain search results for a wide variety of content. However, traditional techniques that were utilized to provide search results may become limited when confronted with different types of content. For example, traditional search results included links to websites with brief textual descriptions. These search results were typically provided in response to keywords in a search request. However, the functionality of these traditional techniques may be limited in relation to other types of content, such as images.

SUMMARY

Image search techniques are described. In one or more implementations, images in a search result are ordered based at least in part on similarity of the images, one to another. The search result having the ordered images is provided in response to a search request.

In one or more implementations, a search request is received having at least one term that is indicative of at least two or more different types of images. A search result is provided in response to the search request. The search result includes a first type of the image positioned closer to a beginning of the search result than a second type of the image. The first type of the image has a larger number of similar images than the second type.

In one or more implementations, a plurality of binary words is generated, each to describe content in respective one of a plurality of images. The plurality of binary words are compared, one to another, to determine similarity of respective images. Clusters are formed based on the comparison of the determined similarity of the images. The images are ranked based on a number of similar images in a respective cluster for inclusion in a search result to be provided in response to a search query received via an internet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is a flow diagram depicting a procedure in an example implementation in which a search result is configured for a search request that is indicative of two or more different types of content in the images.

DETAILED DESCRIPTION

Overview

Traditional techniques to perform a search may be limited when confronted with different types of content. For example, traditional techniques that are utilized to search for a webpage may provide a search result that is difficult to decipher when requested to search for a particular image.

Image search techniques are described. In one or more implementations, search techniques are employed that may help to differentiate between different types of images. For example, a search query may be received that may relate to a different person, place, or thing. Traditional image search techniques, when encountering such a situation may intermix the results such that a user may have a difficult time in locating a particular image of interest. However, in this example, clustering may be employed to form groups of images based on similarity. These groups may then serve as a basis for ordering a search result, thereby increasing the likelihood that a user may locate a particular image of interest. Further discussion of these and other techniques may be found in relation to the following sections.

In the following discussion, an example environment is first described that is operable to perform image search techniques described herein. Example procedures are then described, which are operable in the example environment as well as in other environments. Likewise, the example environment is not limited to performance of the example procedures. Further, although the search techniques are described in relation to search for images, these techniques may be employed to search for a variety of different types of data, such as webpages, media, documents, files, and so on.

Example Environment

Figure 1:
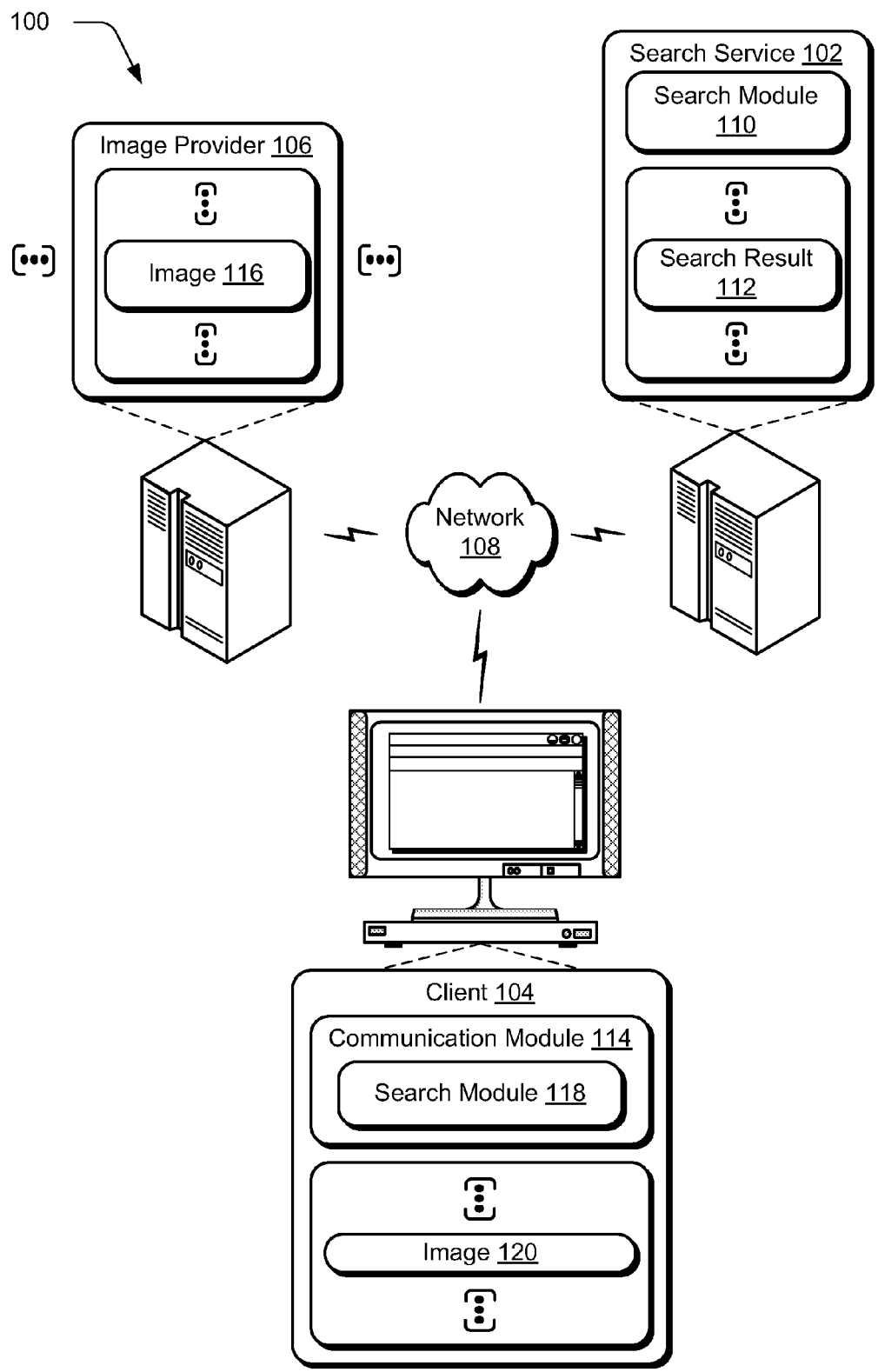
FIG. 1 is an illustration of an environment in an example implementation that is operable to perform a search.

FIG. 1 is an illustration of an environment 100 in an example implementation that is operable to employ image search techniques. The illustrated environment 100 includes a search service 102, a client 104, and an image provider 106, each of which are communicatively coupled, one to another, over a network 108.

Although the client 104 is illustrated as a client device (e.g., a traditional desktop computer) and the search service 102 and image provider 106 are illustrated as being implemented by one or more servers, these entities may be implemented by a variety of different devices. For example, the client 104 may be configured as a computer that is capable of communicating over the network 108, such as a desktop computer, a mobile station, an entertainment appliance, a set-top box communicatively coupled to a display device, a wireless phone, a game console, a tablet computer, a netbook, and so forth. Thus, the client 104 may range from a full resource device with substantial memory and processor resources (e.g., personal computers, game consoles) to a low-resource device with limited memory and/or processing resources (e.g., traditional set-top boxes, hand-held game consoles). The client 104 may also describe logical clients that include software and/or as well as hardware that is used to execute the software, e.g., one or more processors, functional blocks, and so on.

Thus, the client may describe a computing device that may also include an entity (e.g., software) that causes hardware of the computing device to perform operations, e.g., configures processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform the operations. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), optical discs, flash memory, hard disk memory, and other memory devices that may use magnetic, optical, and other techniques to store instructions and other data.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The search service 102 is illustrated as including a search module 110. The search module 110 is representative of functionality to provide a search result 112 in response to a search query. For example, a user of the client 104 may interact with a communication module 114, which is representative of functionality of the client 104 to interact with the network 108, such as a browser over the Internet.

The search module 110 may employ a variety of different techniques to form a search result 112. For example, the search module 110 may employ one or more software robots ("bots") to search and index content available over the Internet. These indexes may be based on keywords and other information. Further, a variety of different techniques may be employed to apply different weights to parts of the index such that a user has an increased likelihood of finding content of interest.

For a given query for images, however, it may difficult to find a representative set of images that best represent the query using traditional techniques. For example, the search module 110 may index images 116 from a plurality of different image providers 106. However, in some instances a single search query may relate to different types of content in the image, such as a different person, place, or thing. Accordingly, the search module 110 in this example may employ techniques that may be used to increase a likelihood of a user receiving a search result 112 that includes a desired image, further discussion of which may be found in relation to FIG. 2.

Although an example of Internet search was described in relation to FIG. 1, these techniques may be leveraged for a variety of other uses. For example, the client 104 may also employ a search module 118 to search images 120 that are local to the client 104, images 116 accessible remotely via the network 108, and so on. A variety of other examples are also contemplated, and accordingly this discussion is not limited to the example environment 100.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the image search techniques described below are platform-independent, meaning that the techniques may be implemented on a variety of commercial computing platforms having a variety of processors.

Figure 2:
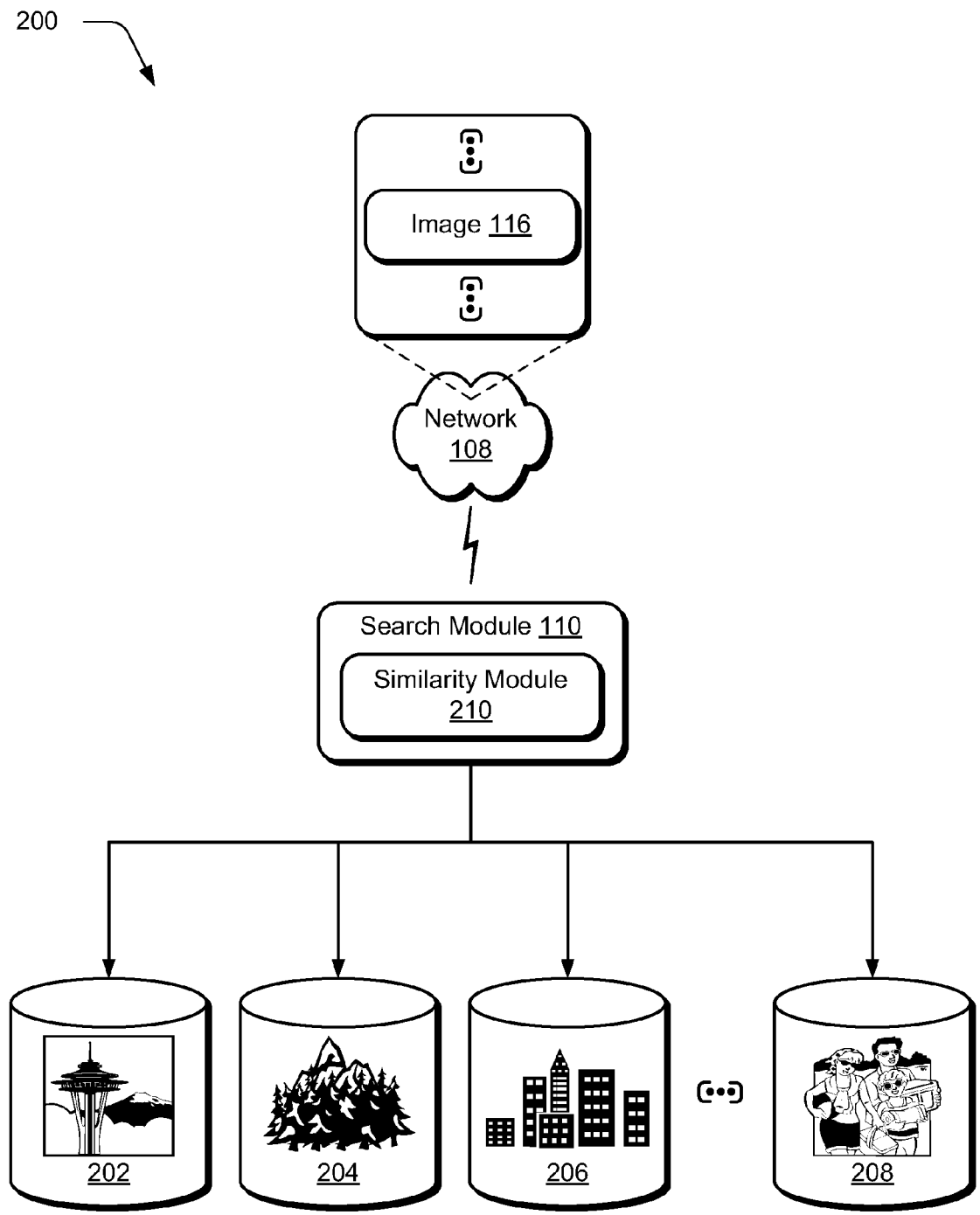
FIG. 2 is an illustration of a system in an example implementation showing a search module of FIG. 1 as processing images to obtain a search result for provision to a client.

FIG. 2 is an illustration of a system 200 in an example implementation showing the search module 110 of FIG. 1 as processing images to obtain a search result. The search module 110 in this example accesses images 116 that are available via the network 108. The search module 110 then employs a plurality of buckets 202, 204, 206, 208 to cluster images together based on similarity of the images, one to another, as computed using a similarity module 210. This similarity may thus serve as a basis to provide a search result 112 that has an increased likelihood of providing a user an opportunity to locate an image 116 of interest.

For example, the search module 110 may be employed to process images for a keyword, which in this instance is "Seattle." Accordingly, the search module 110 may scan the images 116 for similarities using the similarity module 210. For instance, the similarity module 210 may examine the images to determine what content is included in the images. The similarity module 210 may then assign an identifier to this content and compare the identifiers to determine which images are similar. A variety of different techniques may be used to determine similarity, an example of which is described in relation to FIG. 5.

Similar images may then be formed into clusters. Continuing with the previous example, images for the keyword "Seattle" that contain content relating to the Space Needle may be assigned to a first bucket 202. Likewise, images for the keyword "Seattle" that contain content relating to Mount Rainier may be assigned to a second bucket 204. Further, images for the keyword "Seattle" that contain content relating to the Seattle skyline may be assigned to a third bucket 206. This process may continue for a variety of different content, including images of a family vacation to Seattle as illustrated for the fourth bucket 208.

A number of images assigned to the different buckets 202-208 may then serve as a basis for ordering a search result. In the illustrated example, the buckets 202-208 are arranged in an ordered indicating a number of images that were assigned to the respective bucket, such that bucket 202 was assigned more images than bucket 204, and so on.

This ordering may then be used as a basis to arrange images in a search result, such that images from the first bucket 202 of the Space Needle may be moved up in rank in the search result 112. In this way, a user is more likely to obtain an image of interest in response to a search query. These techniques may be leveraged to provide a variety of other functionality, further discussion of which may be found in relation to the following procedures.

Example Procedures

The following discussion describes image search techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

FIG. 3 depicts a procedure 300 in an example implementation in which a search result is configured for a search request that is indicative of two or more different types of content in the images. A request is received having at least one term that is indicative of at least two or more different types of content in the images (block 302). For example, the request may be received having a search term "jaguar." However, the term jaguar may relate to an automobile as well as an animal. Previous techniques that were used to provide images often resulted in a confused result in which both types of images were intermixed. Using the techniques described herein, though, the search result may differentiate between the different types.

Accordingly, in this example a search result is provided in response to the search request, the search result having images that include a first type of the content positioned closer to a beginning of the search result than images having a second type of the content, the first type of the image having a larger number of similar images than the second type (block 304). Continuing with the previous example, the search module 110 may employ techniques to differentiate between images of the automobile and the animal for "jaguar."

For instance, the search module 110 may be configured to promote similar images that are more common. In this way, images have a more common content in a meaning for the term (e.g., jaguar) may be promoted in a ranking of the search result 112 over less common meanings. A variety of different techniques may be employed to determine similarity, further discussion of which may be found in relation to the following figure. Although in this example a request was described as being received and search results were then provided in response to the request, it should be readily apparent that the search results may be computed in a variety of ways. For example, the search results 112 may be pre-computed before receipt of the request (e.g., using indexing techniques described in relation to FIG. 2), in response to the request, and so on.

Figure 4:
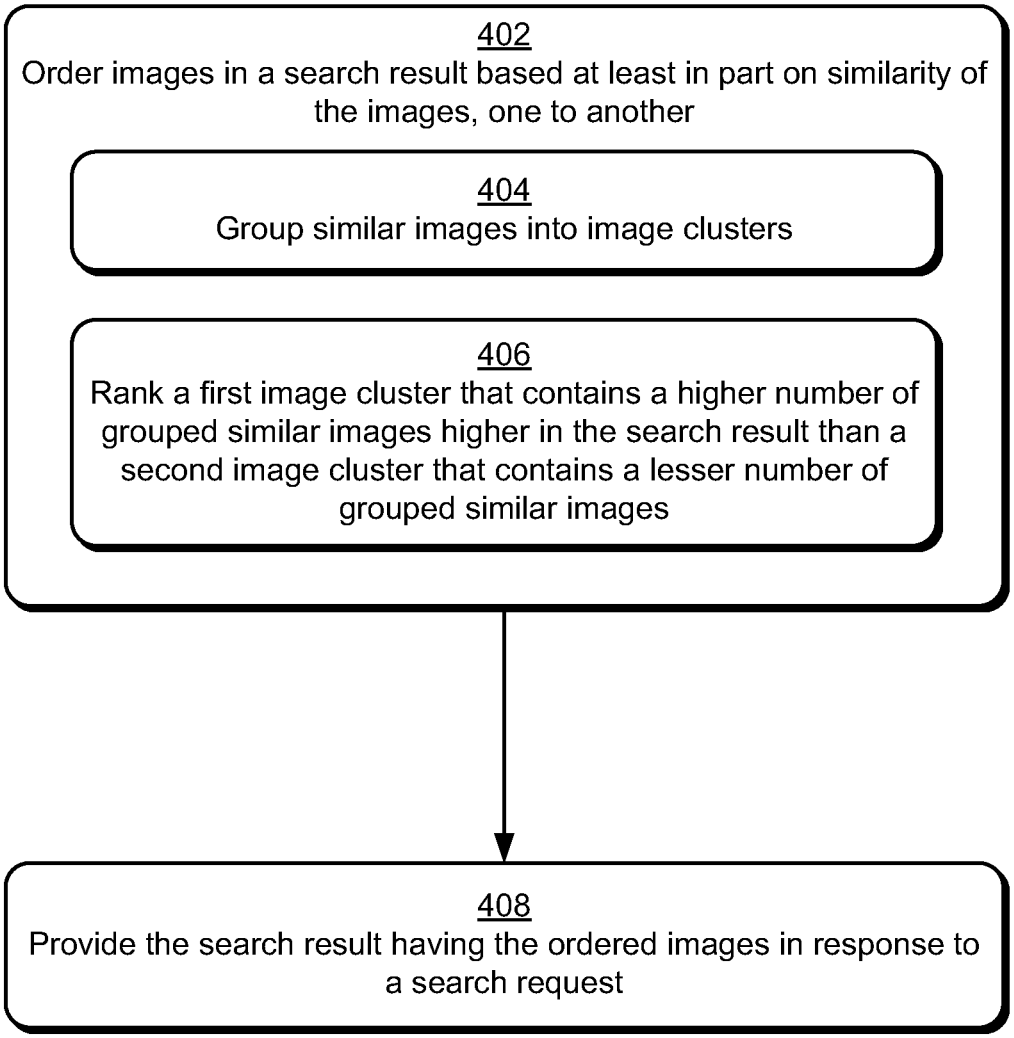
FIG. 4 is a flow diagram depicting a procedure in an example implementation in which images are ordered in a search result based on similarity.

FIG. 4 depicts a procedure 400 in an example implementation in which images are ordered in a search result based on similarity. Images in a search result are ordered based at least in part on similarity of the images, one to another (block 402). For example, similar images may be grouped into image clusters (block 404). This similarity may be determined in a variety of ways, such as through an examination of the content of the images including the use of recognition techniques that may be used to identify a face or other object. An example of one such technique using binary words to examine content in images is described in relation to FIG. 5.

A first image cluster that contains a higher number of grouped similar images is ranked higher in a search result than a second image cluster that contains a lesser number of grouped similar imaged (block 406). Thus, a number of images in respective clusters may be used to drive "where" the images are included in a search result 112, such by ranking them higher or lower depending on pervasiveness of content included in the images and similarity of that content across those images. Thus, the search result 112 is more likely to include images having content that are of interest based on the interest shown in that content by the number of those images that are available.

Figure 5:
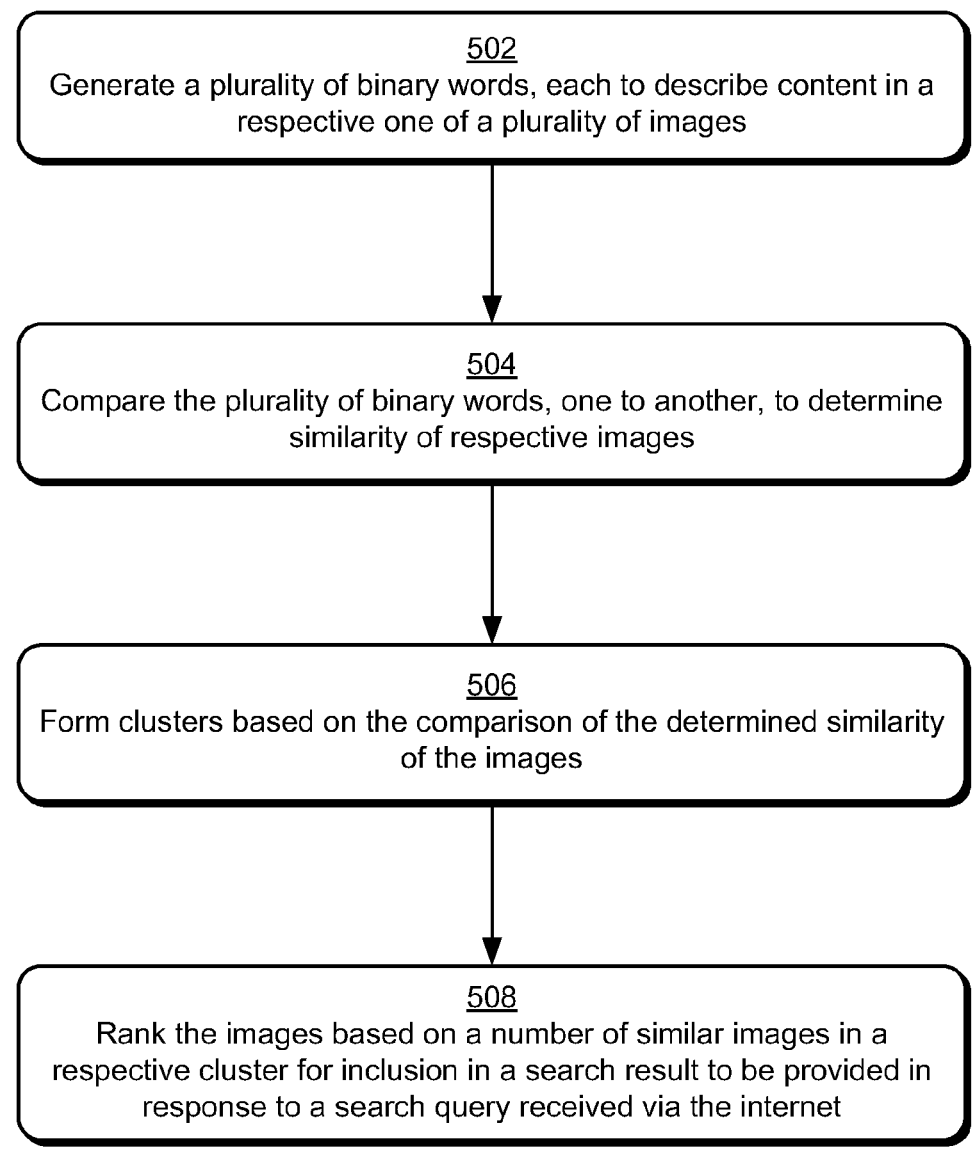
FIG. 5 is a flow diagram depicting a procedure in an example implementation in which a binary word is generated to describe content in images and used as a basis of comparison to determine similarity of the images, one to another.

FIG. 5 depicts a procedure 500 in an example implementation in which a binary word is generated to describe content in images and used as a basis of comparison to determine similarity of the images, one to another. A plurality of binary words is generated, each to describe content in a respective one of a plurality of images (block 502). For example, the search module 110 may examine content in images and describe the content through use of a binary word. The binary word, for instance, may describe an automobile included in the image, an animal included in the image, and so on. In an implementation, an image may have a plurality of corresponding binary words that may be used to identify content in the image, such as a car and logo contained in the image.

The plurality of binary words are compared, one to another, to determine similarity of respective images (block 504). Continuing with the previous example, the binary words may be compared to each other by the search module 110. In this way, the search module 110 may perform an efficient comparison of a multitude of images to determine similarity.

Clusters are formed based on the comparison of the determined similarity of the images (block 506). As described in relation to FIG. 2, the search module 110 may form the clusters by assigning images to buckets based on similarity of the images. Thus, images in a particular bucket are determined to be similar and may give an accurate comparison of a number of this type of image in relation to a number of other types of images assigned to other buckets.

The images are ranked based on a number of similar images in a respective cluster for inclusion in a search result to be provided in response to a search query received via the internet (block 508). Continuing with the previous example, the clusters formed by the "bucketing" of the images may be used to give an idea of relative prevalence of content in the images with respect to each other. Accordingly, the search module 110 may leverage this knowledge to order the search result 112 to follow this prevalence, thereby increasing a likelihood that a user will be presented with an image of interest. Further, in an implementation the search results may be clustered such that each cluster is represented by the similar image in the search result 112. In this way, a user may quickly navigate through different images to locate a particular one of interest without viewing a same of very similar image multiple times. In an implementation, this representative image may be selectable to cause output of additional images from the cluster.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more modules at least partially in hardware, the method comprising:
generating a first binary word to describe a first type of content;

generating a second binary word to describe a second type of content, the second type of content corresponding to the first type of content and not describing the first type of content;

generating a third binary word to describe a third type of content, the third type of content no corresponding to or describing the first to of content and the second type of content;

identifying the first type of content and the second type of content in respective images based at least in part on the first and second binary words, at least one of the images containing the first type of content and the second type of content;

identifying the third type of content in the images based at least in part on the third binary word, which does not correspond to the first binary word and the second bin word;

grouping similar images into image clusters based at least in part on the first binary word, the second binary word, and the third binary word, the first type of content and second type of content being grouped together, and the third type of content being grouped separately;

ranking a first said image cluster that contains a higher number of grouped similar said images higher in the search result than a second said image cluster that contains a lesser number of grouped similar said images;

ordering the images in a search result based at least in part on the grouping and the ranking; and providing the search result having the ordered images in response to a search request.

2. A method as described in claim 1, wherein the first said image cluster includes a different type of content in the images than the second said image cluster.

3. A method as described in claim 1, wherein said generating the first binary word, generating the second binary word, generating the third binary word, identifying the first type of content and the second type of content, identifying the third type of content, grouping, ranking, and ordering are pre-computed before receipt of the search request.

4. A method as described in claim 1, wherein said generating the first binary word, generating the second binary word, generating the third binary word, identifying the first type of content and a second type of content, identifying the third type of content, grouping, ranking, ordering, and providing are performed by the one or more modules as part of an Internet search service.

5. A method as described in claim 1, wherein said generating the first binary word, generating the second binary word, generating the third binary word, identifying the first type of content and a second type of content, identifying the third type of content, grouping, ranking, ordering, and providing are performed by the one or more modules of a client and at least one image is stored locally at the client in memory.

6. A method as described in claim 1, wherein the first type of content and the second type of content relates to a person, place, or thing and the third type of content relates to a different person, place, or thing.

7. A method as described in claim 1, further comprising storing the ranking in memory accessible to the search service.

8. A method implemented by one or more modules of a search service at least partially in hardware, the method comprising:

generating a first binary word to describe a first type of content;

generating a second binary word to describe a second type of content, the second type of content corresponding to the first type of content and not describing the first type of content;

generating a third binary word to describe only a third type of content, the third type of content not corresponding to or describing the first type of content and the second type of content;

identifying the first type of content and the second type of content in a plurality of images based at least in part on the first and second binary words, which comprise corresponding binary words, at least one of the images containing the first type of content and the second type of content;

identifying the third type of content in the images based at least in part on the third binary word, which does not correspond to the first binary word and the second binary word;

comparing the plurality of images, one or another, to determine similarity of the images based at least in part on the first binary word, the second binary word, and the third binary word;

forming clusters based at least in part on the comparing of the determined similarity of the images, the first type of content and second type of content being clustered together, and the third type of content being clustered separately; and ranking the images based at least in part on a number of similar images in a respective said cluster for inclusion in a search result to be provided in response to a search query received via an internet.

9. A method as described in claim 8, wherein a first said cluster relates to the first type of content and the second type of content in the images different than the third type of content in a second said cluster.

10. A method as described in claim 8, wherein said generating the first binary word, generating the second binary word, generating the third binary word, identifying the first type of content and the second type of content, identifying the third type of content, comparing, forming, and ranking are performed before the search query is received via the internet.

11. A method as described in claim 8, further comprising storing the ranking in memory accessible to the search service.

12. A method as described in claim 8, wherein the ranking promotes a first said cluster having a relatively higher number of common features over a second said cluster having a relatively lower number of common features.

13. A method as described in claim 8, wherein said generating the first binary word, generating the second binary word, generating the third binary word, identifying the first type of content and a second type of content, identifying the third type of content, and comparing are performed by the one or more modules of a client and at least one image is stored locally at the client in memory.

14. A method as described in claim 8, wherein said forming is pre-computed before receipt of the search request.

15. A system comprising:

one or more modules of a search service at least partially in hardware, the one or more modules configured to perform operations comprising:

generating a first binary word to describe a first type of content;

generating a second binary word to describe a second type of content, the second type of content corresponding to the first type of content and not describing the first type of content;

generating a third binary word to describe only a third type of content, the third type of content not corresponding to or describing the first type of content and the second type of content;

identifying the first type of content and the second type of content in a plurality of images based at least in part on the first and second binary words, which comprise corresponding binary words, at least one of the images containing the first type of content and the second type of content;

identifying the third type of content in the images based at least in part on the third binary word, which does not correspond to the first binary word and the second binary word;

comparing the plurality of images, one or another, to determine similarity of the images based at least in part on the first binary word, the second binary word, and the third binary word;

forming clusters based at least in part on the comparing of the determined similarity of the images, the first type of content and second type of content being clustered together, and the third type of content being clustered separately; and ranking the images based at least in part on a number of similar images in a respective said cluster for inclusion in a search result to be provided in response to a search query received via an internet.

16. A system as described in claim 15, wherein a first said cluster relates to the first type of content and the second type of content in the images different than the third type of content in a second said cluster.

17. A system as described in claim 15, wherein said generating the first binary word, generating the second binary word, generating the third binary word, identifying the first type of content and the second type of content, identifying the third type of content, comparing, forming, and ranking are performed before the search query is received via the internet.

18. A system as described in claim 15, further comprising storing the ranking in memory accessible to the search service.

19. A system as described in claim 15, wherein the ranking promotes a first said cluster having a relatively higher number of common features over a second said cluster having a relatively lower number of common features.

20. A system as described in claim 15, wherein said generating the first binary word, generating the second binary word, generating the third binary word, identifying the first type of content and a second type of content, identifying the third type of content, and comparing are performed by the one or more modules of a client and at least one image is stored locally at the client in memory.

* * * * *

UNITED STATES PATENT AND TRADEMARK OFFICE
CERTIFICATE OF CORRECTION

PATENT NO. : 8,750,629 B2
APPLICATION NO. : 12/958242
DATED : June 10, 2014
INVENTOR(S) : Yue Ma et al.

It is certified that error appears in the above-identified patent and that said Letters Patent is hereby corrected as shown below:

In the Claims
Column 6, line 64-Column 7, line 31, Claim 1 should read as follows:

1. A method implemented by one or more modules at least partially in hardware, the method comprising: generating solely a first binary word to describe a first type of content; generating solely a second binary word to describe a second type of content, the second type of content corresponding to the first type of content and not describing the first type of content; generating solely a third binary word to describe a third type of content, the third type of content no not corresponding to or describing the first to type of content and the second type of content; identifying the first type of content and the second type of content in respective images based at least in part on the first and second binary words, at least one of the images containing the first type of content and the second type of content; identifying the third type of content in the images based at least in part on the third binary word, which does not correspond to the first binary word and the second bin binary word; grouping similar images into image clusters based at least in part on the first binary word, the second binary word, and the third binary word, the first type of content and second type of content being grouped together, and the third type of content being grouped separately; ranking a first said image cluster that contains a higher number of grouped similar said images higher in the search result than a second said image cluster that contains a lesser number of grouped similar said images; ordering the images in a search result based at least in part on the Signed and Sealed this
Eleventh Day of November, 2014

Michelle K. Lee
*Deputy Director of the United States Patent and Trademark Office*

CERTIFICATE OF CORRECTION (continued)
U.S. Pat. No. 8,750,629 B2 grouping and the ranking; and providing the search result having the ordered images in response to a search request.

Column 7, line 63-Column 8, line 31, Claim 8 should read as follows:

8. A method implemented by one or more modules of a search service at least partially in hardware, the method comprising: generating <u>solely</u> a first binary word to describe a first type of content; generating <u>solely</u> a second binary word to describe a second type of content, the second type of content corresponding to the first type of content and not describing the first type of content; generating <u>solely</u> a third binary word to describe only a third type of content, the third type of content not corresponding to or describing the first type of content and the second type of content; identifying the first type of content and the second type of content in a plurality of images based at least in part on the first and second binary words, which comprise corresponding binary words, at least one of the images containing the first type of content and the second type of content; identifying the third type of content in the images based at least in part on the third binary word, which does not correspond to the first binary word and the second binary word; comparing the plurality of images, one or another, to determine similarity of the images based at least in part on the first binary word, the second binary word, and the third binary word; forming clusters based at least in part on the comparing of the determined similarity of the images, the first type of content and second type of content being clustered together, and the third type of content being clustered separately; and ranking the images based at least in part on a number of similar images in a respective said cluster for inclusion in a search result to be provided in response to a search query received via an internet.

Column 8, line 58-Column 9, line 26, Claim 15 should read as follows:

15. A system comprising: one or more modules of a search service at least partially in hardware, the one or more modules configured to perform operations comprising: generating <u>solely</u> a first binary word to describe a first type of content; generating <u>solely</u> a second binary word to describe a second type of content, the second type of content corresponding to the first type of content and not describing the first type of content; generating <u>solely</u> a third binary word to describe only a third type of content, the third type of content not corresponding to or describing the first type of content and the second type of content; identifying the first type of content and the second type of content in a plurality of images based at least in part on the first and second binary words, which comprise corresponding binary words, at least one of the images containing the first type of content and the second type of content; identifying the third type of content in the images based at least in part on the third binary word, which does not correspond to the first binary word and the second binary word; comparing the plurality of images, one or another, to determine similarity of the images based at least in part on the first binary word, the second binary word, and the third binary word; forming clusters based at least in part on the comparing of the determined similarity of the images, the first type of content and second type of content being clustered together, and the third type of content being clustered separately; and ranking the images based at least in part on a number of similar images in a respective said cluster for inclusion in a search result to be provided in response to a search query received via an internet.